United States Patent
Srinivasan

(10) Patent No.: US 9,516,359 B2
(45) Date of Patent: Dec. 6, 2016

(54) SESSION BASED WATERMARKING OF MEDIA CONTENT USING ENCRYPTED CONTENT STREAMS

(71) Applicant: DivX, LLC, San Diego, CA (US)

(72) Inventor: Mayur Srinivasan, San Diego, CA (US)

(73) Assignee: DIVX, LLC, San Diego, CA (US)

( * ) Notice: Subject to any disclaimer, the term of this patent is extended or adjusted under 35 U.S.C. 154(b) by 6 days.

(21) Appl. No.: 14/680,998

(22) Filed: Apr. 7, 2015

(65) Prior Publication Data

US 2016/0301958 A1   Oct. 13, 2016

(51) Int. Cl.
| | | |
|---|---|---|
| G06F 21/60 | (2013.01) | |
| H04N 21/2389 | (2011.01) | |
| H04N 21/2347 | (2011.01) | |
| H04N 21/239 | (2011.01) | |
| H04N 21/254 | (2011.01) | |
| H04N 21/8352 | (2011.01) | |
| H04N 21/8358 | (2011.01) | |

(52) U.S. Cl.
CPC ...... *H04N 21/23897* (2013.01); *G06F 21/602* (2013.01); *H04N 21/2393* (2013.01); *H04N 21/23476* (2013.01); *H04N 21/2541* (2013.01); *H04N 21/8352* (2013.01); *H04N 21/8358* (2013.01)

(58) Field of Classification Search
CPC ............................... G06F 21/60; G06F 21/602
See application file for complete search history.

(56) References Cited

U.S. PATENT DOCUMENTS

| | | | | |
|---|---|---|---|---|
| 7,320,069 | B1* | 1/2008 | Sundharraj | G06F 21/10 348/E7.056 |
| 7,751,560 | B2* | 7/2010 | Candelore | H04N 7/162 380/200 |
| 8,325,916 | B2* | 12/2012 | Oliveira | H04N 7/1675 380/200 |
| 8,726,029 | B2 | 5/2014 | Katzenbeisser et al. | |
| 8,781,967 | B2 | 7/2014 | Tehranchi et al. | |
| 8,850,590 | B2* | 9/2014 | Kellerman | H04L 9/3247 380/260 |
| 2003/0009669 | A1 | 1/2003 | White et al. | |

(Continued)

OTHER PUBLICATIONS

International Search Report and Written Opinion for PCT/US16/21536 dated May 26, 2016; 10 pages.

*Primary Examiner* — William Powers
(74) *Attorney, Agent, or Firm* — Loza & Loza, LLP; Gabriel Fitch

(57) ABSTRACT

Methods for session based watermarking of media content using encrypted content streams are provided. At least two content streams of the same media content are watermarked with different watermark information and encrypted using different encryption percentages. During a playback session, a unique sequence is generated and provided to a client device for use by the client device in selecting consecutive content segments from the different content streams to produce the original media content with a watermark that uniquely identifies a user of the client device. When selecting the different content segments, the client device compares the encryption percentage of certain selected content segments with the expected encryption percentage for those content segments to determine whether the content streams have been tampered with.

15 Claims, 10 Drawing Sheets

(56) References Cited

U.S. PATENT DOCUMENTS

| | | | |
|---|---|---|---|
| 2003/0177400 A1* | 9/2003 | Raley | G06F 21/10 713/168 |
| 2003/0196121 A1* | 10/2003 | Raley | G06F 21/10 726/21 |
| 2004/0202322 A1 | 10/2004 | Chavanne et al. | |
| 2009/0228709 A1 | 9/2009 | Kellerman | |
| 2011/0129116 A1 | 6/2011 | Thorwirth | |
| 2012/0063595 A1* | 3/2012 | Massoudi | H04N 7/1675 380/210 |
| 2013/0054972 A1 | 2/2013 | Thorwirth | |
| 2013/0061040 A1 | 3/2013 | Kiefer et al. | |
| 2013/0166868 A1* | 6/2013 | Jarnikov | H04N 21/23892 711/162 |
| 2013/0219182 A1 | 8/2013 | Barnes | |

* cited by examiner

SESSION BASED WATERMARKING OF MEDIA CONTENT USING ENCRYPTED CONTENT STREAMS

BACKGROUND

As the demand for access to digital media content has increased, content providers have begun searching for more effective solutions to prevent unauthorized redistribution of downloaded digital media content. Digital rights management (DRM) systems have traditionally provided some protection against piracy of copyrighted content. DRM systems seek to control access to copyrighted content by encrypting the digital media content prior to playback by a user, and then subsequently restricting the use of that media content by the user. However, once the digital media content is decrypted and rendered in analog form on a client device, the media content can be readily copied and distributed to unlicensed users.

Digital watermarking has been developed as a tool to help identify those users that redistribute media content illegally. A digital watermark refers to imperceptible information that is embedded in the media content and that uniquely identifies a user. For example, for each streaming session, a content provider can embed a unique watermark in the digital media content streamed to a client device. However, separately embedding a unique watermark in each streamed copy of media content is computationally expensive and impractical in many broadcast and unicast applications, such as video on demand.

To scale digital watermarking for multi-user applications, two or more copies of the same media content can be created, each having different watermark information embedded therein. Each copy can be further segmented into corresponding temporal content segments and streamed to a client device. A unique sequence generated for the client device can then be used by the client device to select between content segments of the different streams to produce watermarked media content that uniquely identifies the user of the client device.

However, if the unique sequence is tampered with, for example, by replacing one stream with another stream, the watermarking technology is unable to identify the user or source of pirated media content.

SUMMARY

Embodiments of the present disclosure are directed to apparatus and methods for session based watermarking of media content. In one embodiment, a method for session based watermarking of media content includes encrypting a first content stream using a first encryption percentage to produce a first encrypted content stream having a first percentage of encrypted content and encrypting a second content stream using a second encryption percentage to produce a second encrypted content stream having a second percentage of encrypted content different than the first percentage of encrypted content, in which each of the first and second content streams includes different watermark information. The method further includes generating a unique sequence for a client device, in which the unique sequence represents consecutive content segments selected from a first plurality of content segments of the first content stream and a second plurality of content segments of the second content stream. The method additionally includes providing the first encrypted content stream and the second encrypted content stream to the client device to enable a playback session of the media content to be established using the unique sequence generated for the client device. The playback session includes at least one switch between the first encrypted content stream and the second encrypted content stream at the client device.

In another embodiment, a method for establishing a playback session of media content includes receiving a first encrypted content stream of the media content from a content server and receiving a second encrypted content stream of the media content from the content server. The first encrypted content stream includes a first plurality of content segments and has a first percentage of encrypted content and the second encrypted content stream includes a second plurality of content segments and has a second percentage of encrypted content different than the first percentage of encrypted content, in which each of the first and second encrypted content streams includes different watermark information. The method further includes receiving a unique sequence, receiving an expected encryption percentage for each of the first encrypted content stream and the second encrypted content stream and selecting consecutive content segments of the media content from the first plurality of content segments and the second plurality of content segments based on the unique sequence, in which the selecting includes switching, at least once, between the first encrypted content stream and the second encrypted content stream. The method additionally includes comparing an actual encryption percentage of a selected content segment with the expected encryption percentage for the selected content segment based on the respective content stream and determining whether to render the media content by the client device based on the comparing of the actual encryption percentage with the expected encryption percentage.

DETAILED DESCRIPTION

In the following description, numerous specific details are set forth to provide a thorough understanding of various embodiments of the present invention. It will be apparent, however, to one skilled in the art that these specific details need not be employed to practice various embodiments of the present invention. In other instances, well-known components or methods have not been described in detail to avoid unnecessarily obscuring various embodiments of the present invention.

As used herein, the term "media content" refers to any type of digital media, such as audio, video, images, graphics/text or any combination thereof. In addition, as used herein, the term "content segment" refers to a part of a media content file, such as a temporal segment of the media content file. As also used herein, the term "watermark" or "session based watermark" refers to imperceptible information embedded within media content that uniquely identifies a licensed user for that media content. As further used herein, the term "streaming" or "streamed" refers to the transmission and reception of media content over a network as a continuous flow for either immediate processing/playback or subsequent processing/playback. For example, in one embodiment, the streamed media content can be stored in a buffer as it is received during playback. In another embodiment, the media content can be streamed/played back from a local storage device.

In accordance with various embodiments of the present invention, a session-based watermark is created using at least two copies of the same media content, each including different watermark information and each being encrypted using a different encryption percentage. In such case, a unique sequence generated for a particular client device is provided to the client device, along with the respective encryption percentages of each of the encrypted content streams. The client device uses the unique sequence to select between corresponding content segments of the encrypted content streams to produce the watermarked media content on the client device. In addition, the client device compares the actual encryption percentage of selected content segments with the expected encryption percentage based on the unique sequence. If the actual encryption percentage does not match the expected encrypted percentage, the client device flags the media content as invalid.

Figure 1:
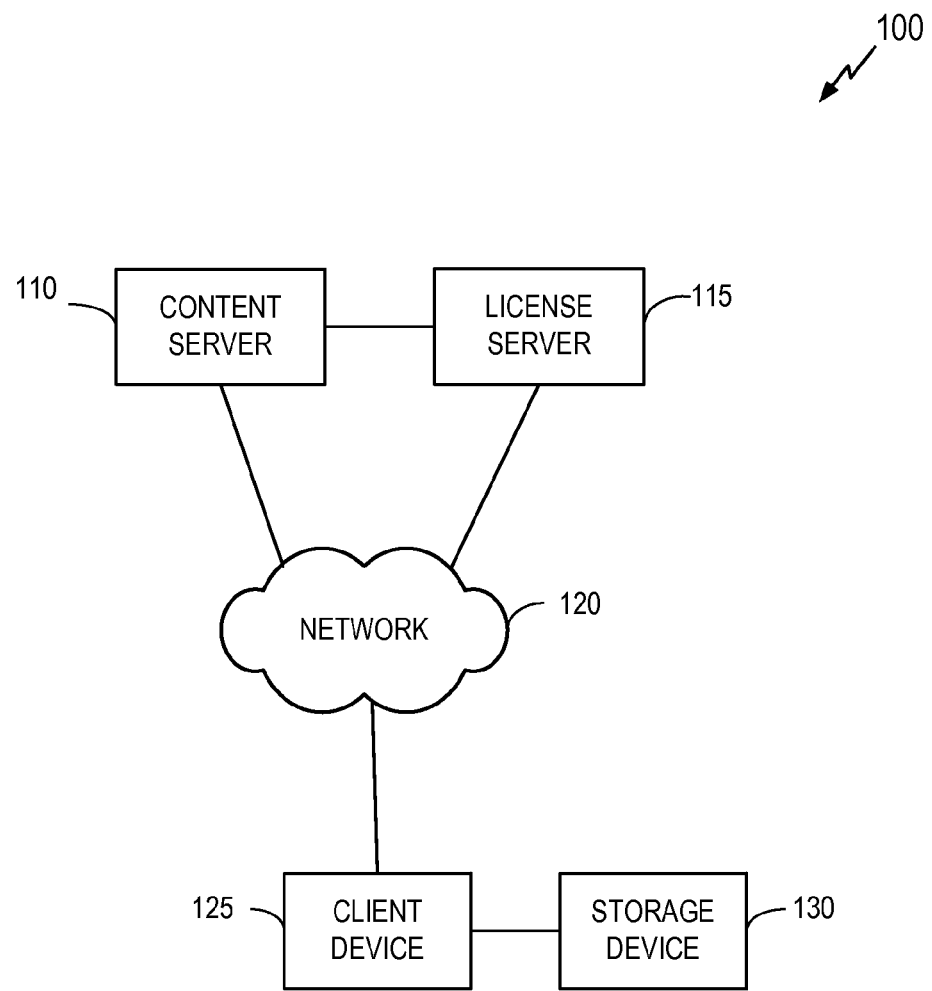
FIG. 1 is a block diagram illustrating an exemplary system for session based watermarking of media content using encrypted content streams in accordance with embodiments of the invention.

FIG. 1 illustrates an exemplary system 100 for session based watermarking of media content using encrypted content streams in accordance with embodiments of the invention. The system 100 includes a content server 110, a license server 115, a client device 125 and a local storage device 130. The client device 125 is an electronic device providing a media player for playback of media content. By way of example, but not limitation, the client device 125 can include a set top box, digital television (DTV) box, digital video recorder, desktop or laptop computer, cell phone, tablet, game console, mp3 player or any other type of media player.

The client device 125 can communicate with the content server 110 and the license server 115 via a network 120, such as the Internet. For example, the client device 125 can communicate with the content server 110 to retrieve media content and can further communicate with the license server 115 to retrieve a license file for the media content. Although the content server 110 and license server 115 are shown as separate network components within the system 100, in other embodiments, the functionality of the license server 115 may be included within the content server 110.

The client device 125 can further store the media content downloaded from the content server 110 on the local storage device 130 for subsequent playback of the media content by the client device 125. In one embodiment, as shown in FIG. 1, the local storage device 130 is external to the client device 125. For example, the external storage device 130 may be a universal serial bus (USB) hard disk drive (HDD), USB memory stick or other type of external storage device. However, in other embodiments, an internal storage device, such as a hard disk drive or other physical media storage device, can be included within the client device 125 to store the downloaded media content. In another embodiment, the media content can be transferred offline from the content server 110 to the storage device 130 without going through the client device 125.

Figure 2:
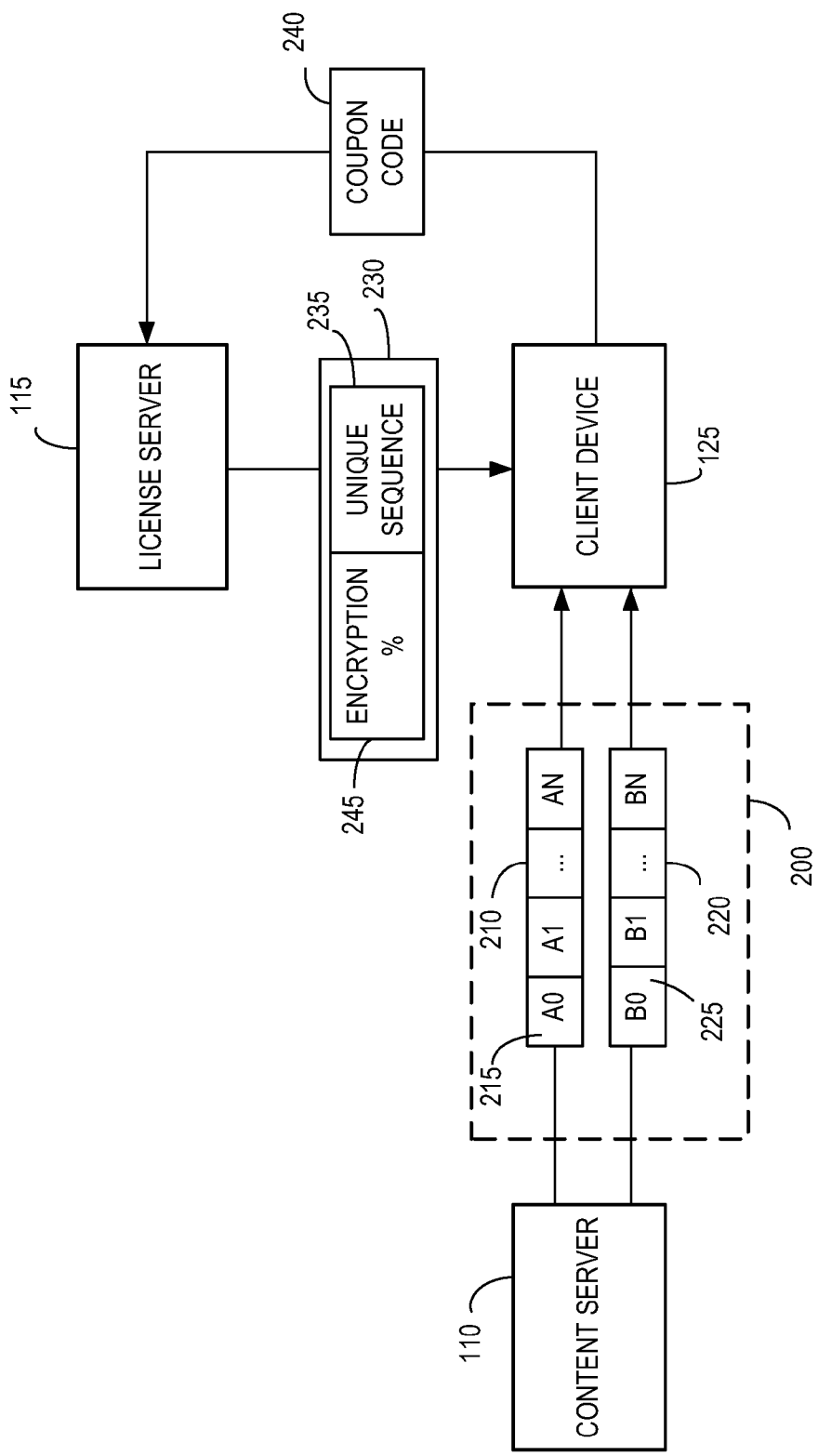
FIG. 2 is a schematic block diagram illustrating exemplary playback session of streamed media content in accordance with embodiments of the invention.

FIG. 2 illustrates an exemplary playback session of media content 200 streamed to the client device 125. The media content 200 can be streamed or otherwise made available to the client device 125 as two or more content streams 210 and 220. The content streams 210 and 220 are separate copies of the same media content provided by a content owner (not shown). Thus, each content stream 210 and 220 includes the same perceptible (audio/visual) information. However, each content stream 210 and 220 includes different imperceptible (watermark) information. The content server 110 (or an external watermarking server) can produce each of these content streams 210 and 220 by embedding the different watermark information into each content stream 210 and 220.

For example, each content stream 210 and 220 can be segmented into identical temporal content segments 215 and 225, respectively, and the same temporal content segment in each content stream can be embedded with different watermark information. In FIG. 2, content stream 210 (Stream A) includes content segments A0, A1, . . . AN and content stream 220 (Stream B) includes content segments B0, B1, . . . BN. Corresponding content segments A0 and B0 include the same portion of the media content (i.e., the same perceptible information), but different watermark information. Likewise, corresponding content segments A1 and B1 include the same perceptible information, but different watermark information. It should be understood that although the temporal length of content segments 215 and 225 may vary, the temporal boundaries between corresponding content segments 215 and 225 in the different streams may be identical to enable switching between content streams 210 and 220 at temporal boundaries between content segments 215 and 225. As an example, content segments A0 and A1 may have different temporal lengths, but content segments A0 and B0 can have the same temporal length and content segments A1 and B1 can have the same temporal length.

The content server 110 can further encrypt each of the content streams 210 and 220 using different encryption percentages. For example, Stream A (content stream 210) can be encrypted at 25% partial Common Encryption (CENC), while Stream B (content stream 220) can be encrypted at 35% CENC. The CENC standard is defined in the International Organization for Standardization (ISO)/International Electrotechnical Commission (IEC) 23001-7

(2012). Each of the encrypted content streams 210 and 220 can then be transferred from the content server 110 to the client device 125 and/or local storage associated with the client device 125 to prepare for playback of the media content 200.

To initiate the playback session, the client device 125 can request a license for the media content 200 from the license server 115. The license server 115 can then generates a unique sequence 235 for the user of the client device 125 and provide the unique sequence 235 to the client device 125. In one embodiment, as shown in FIG. 2, the unique sequence 235 is included within a license file 230 transmitted from the license server 115 to the client device 125. In other embodiments, the license server 115 provides the unique sequence 235 to the client device 125 separate from the license file 230 and the encrypted content streams 210 and 220.

The unique sequence 235 can include, for example, a series of bits, with each bit corresponding to a particular content segment 215 or 225 within a particular content stream 210 or 220. In one embodiment, the unique sequence 235 is generated based on a coupon code 240 provided by the client device 125 to the license server 115. The coupon code 240 is a unique identifier associated with the client device 125. For example, the coupon code 240 can be an identifier assigned to the hard disk drive (internal or external) associated with the client device 125 and on which the content streams 210 and 220 will be stored. In an exemplary embodiment, the unique sequence 235 is the coupon code 240 itself. In another exemplary embodiment, the unique sequence 235 is generated using the coupon code 240. In other embodiments, the unique sequence 235 can be generated in any other manner, such as using a pseudo-random generator.

The client device 125 can use the unique sequence 235 to select content segments 215 and 225 of the encrypted content streams 210 and 220 to produce and render the media content 200 with the appropriate watermark for the user of the client device 125. In particular, the client device 125 can select between corresponding content segments 215 and 225 in each of the encrypted content streams 210 and 220 based on the unique sequence 235 to retrieve temporally consecutive content segments 215 and 225 that collectively form the original perceptible media content 200. For example, if Stream A has content segments A0-A7 and Stream B has content segments B0-B7, then a session corresponding to the unique sequence 00101101 would include the following content segments:

A0, A1, B2, A3, B4, B5, A6, B7

Thus, the first two content segments are selected from Stream A and then at the temporal boundary between the second and third content segments, the client device 125 switches from Stream A to Stream B to select the third content segment. The client device 125 then switches back to Stream A to select the fourth content segment. Selection of content segments 215 and 225 continues in this manner by switching between Stream A and Stream B as indicated by the unique sequence 235.

The client device 125 can further decrypt the selected content segments to produce a decrypted content stream of the media content and then render the media content for viewing and/or listening by the user. Since the unique sequence 235 identifies the user of the client device 125, if the user illegally distributes the decrypted content stream to other users, the watermarking technology can be used to identify the user of the client device 125 as the source of the pirated copies. However, if the unique sequence 125 is tampered with, e.g., by replacing Stream A with Stream B, thereby effectively making the unique sequence shown above become 1111111, conventional watermarking technology would be unable to determine the source of the pirated copies. For example, if the user makes a copy of Stream B and the client device 125 access the copy of Stream B when the unique sequence indicates that a content segment from Stream A should be selected, the final rendered media content would not include the correct watermark for the user of client device 125.

However, in accordance with embodiments of the invention, since the two content streams 210 and 220 are encrypted at different percentages, the client device 125 can detect when one of the streams has been replaced with another stream. To enable decryption of the different content streams and identification of any invalid content, in addition to the unique sequence 235, the client device 125 can further be provided with the encryption percentages 245 of each content stream 210 and 220. In one embodiment, as shown in FIG. 2, the encryption percentages 245 are included within the license file 230. In another embodiment, the encryption percentages are included in, for example, metadata within one or both of the content streams 210 and 220. In yet another embodiment, the encryption percentages are sent to the client device 125 separate from the license file 230 and content streams 210 and 220. In other embodiments, the encryption percentages are fixed and pre-stored on the client device 125.

The client device 125 can use the encryption percentages 245 to not only decrypt the selected content segments 215 and 225, but also to determine whether the content streams 210 and 220 have been tampered with. In an exemplary embodiment, the client device 125 compares the actual encryption percentage of selected content segments 210 or 215 with the expected encryption percentage for those content segments 210 or 215 based on the unique sequence 235.

For example, using the unique sequence above with encryption percentages of 25% for Stream A and 35% for Stream B, upon selecting content segment A0 from Stream A, the client device 125 can compare the encryption percentage of A0 with the expected encryption percentage of 25%. If the encryption percentage of A0 is 25%, the client device 125 can decrypt content segment A0 for rendering by the client device 125. If the encryption percentage of A0 is not 25%, the client device 125 can flag the playback of the media content 200 as invalid. In one embodiment, the client device 125 compares the encryption percentages of each selected content segment 215 or 225. In another embodiment, the client device 125 only compares the encryption percentages of those content segments that follow a switch between streams. For example, the client device can compare the encryption percentages of content segments A0, B2, A3, B4 and A6. In yet another embodiment, the client device 125 only compares the encryption percentages once for each content stream. For example, the client device 125 can compare the encryption percentages of content segments A0 and B2. In other embodiments, the client device 125 compares the encryption percentages based on a random or other selection of content segments.

Figure 3:
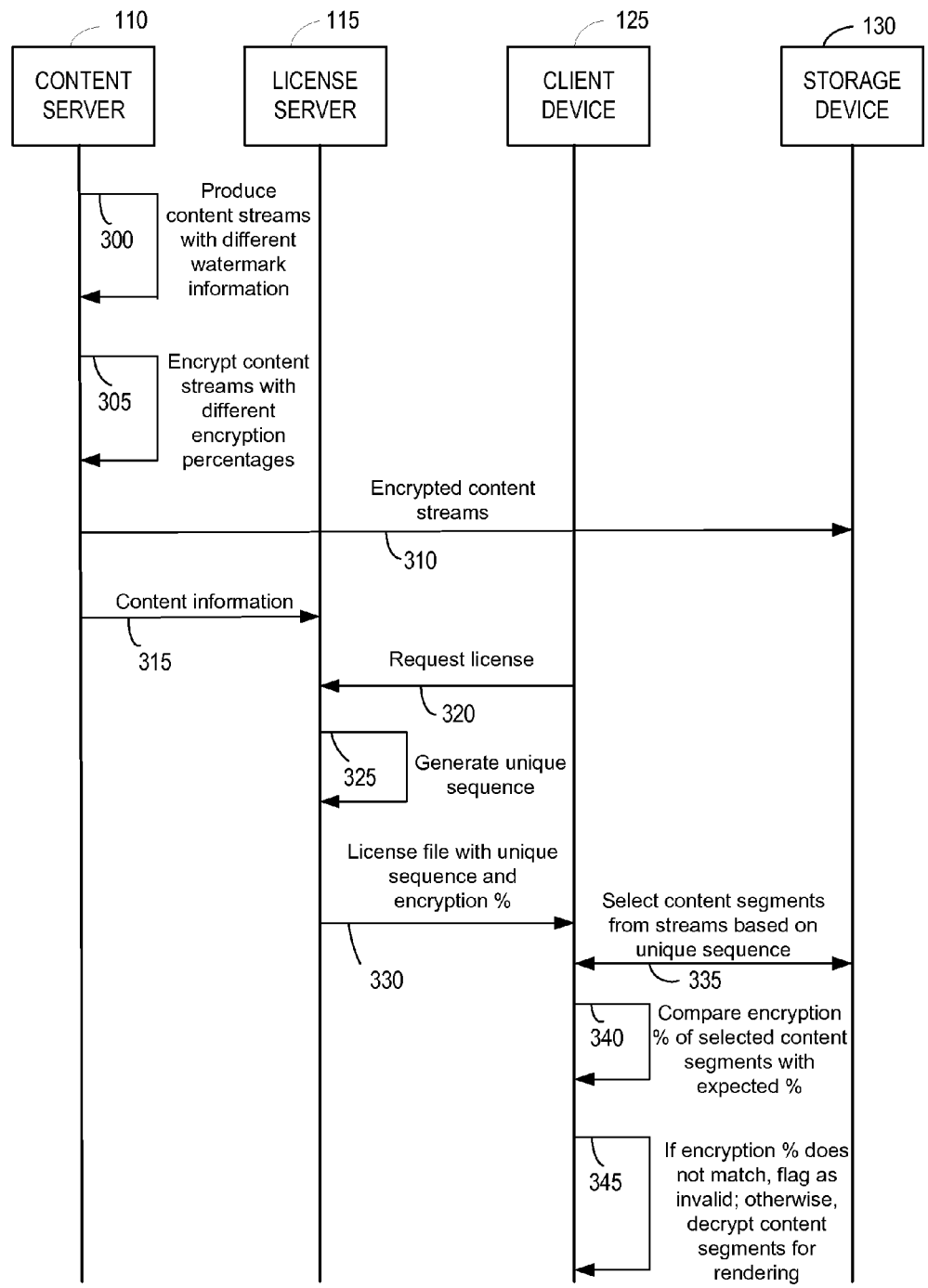
FIG. 3 is a message flow diagram illustrating exemplary processing and communication for establishing a playback session of watermarked media content in accordance with embodiments of the present invention.

FIG. 3 illustrates exemplary processing and communication between the client device 125, the content server 110 and the license server 125 for establishing a playback session of watermarked media content in accordance with embodiments of the present invention. Prior to establishing a playback session of media content with the client device 125, at 300, the content server 110 can produce two or more copies (content streams) of the media content and ensure that different watermark information is embedded into each of the content streams. In an exemplary embodiment, the watermark information is embedded such that corresponding content segments of the content streams each include different embedded watermark information to enable the content streams to be distinguished from one another. At 305, the content server 110 can further encrypt each of the content streams using different encryption percentages. Using the same example from above, one content stream could be encrypted at 25% partial CENC, while another content stream could be encrypted at 35% partial CENC.

At 310, each of the two or more encrypted content streams can then be streamed/transferred to the client device 125 and stored within storage device 130 (which may be internal or external to client device 125) for subsequent playback. The encryption percentage used for each content stream can be included, for example, within metadata in the respective content stream. At 315, the encryption percentages can also be provided to the license server 115, along with other content information.

To initiate a playback session of the media content, at 320, the client device 125 can request a license for the media content from the license server 115. For example, the user of the client device 125 can be prompted to provide payment for the media content and/or agree to the terms of any license for the media content. In response to payment and/or agreement to license terms, at 325, the license server 115 can generate a unique sequence for the client device 125 to be used by the client device 125 in selecting content segments of the encrypted content streams to produce the media content with the appropriate watermark for the user. At 330, the license server 115 can transmit a license file with the unique sequence and encryption percentages to the client device 125.

Upon receiving the unique sequence, at 335, the client device 125 can access the encrypted content streams on the storage device 130 and select between corresponding content segments in each of the encrypted content streams based on the unique sequence to retrieve temporally consecutive content segments that collectively form the original media content.

At 340, the client device 125 can compare the actual encryption percentage of selected content segments with the expected encryption percentage for those content segments based on the unique sequence. At 345, if the compared encryption percentages match, the client device 125 can decrypt the selected content segments for rendering by the client device 125. However, if the compared encryption percentages do not match, the client device 125 can flag the playback of the media content as invalid.

Figure 4:
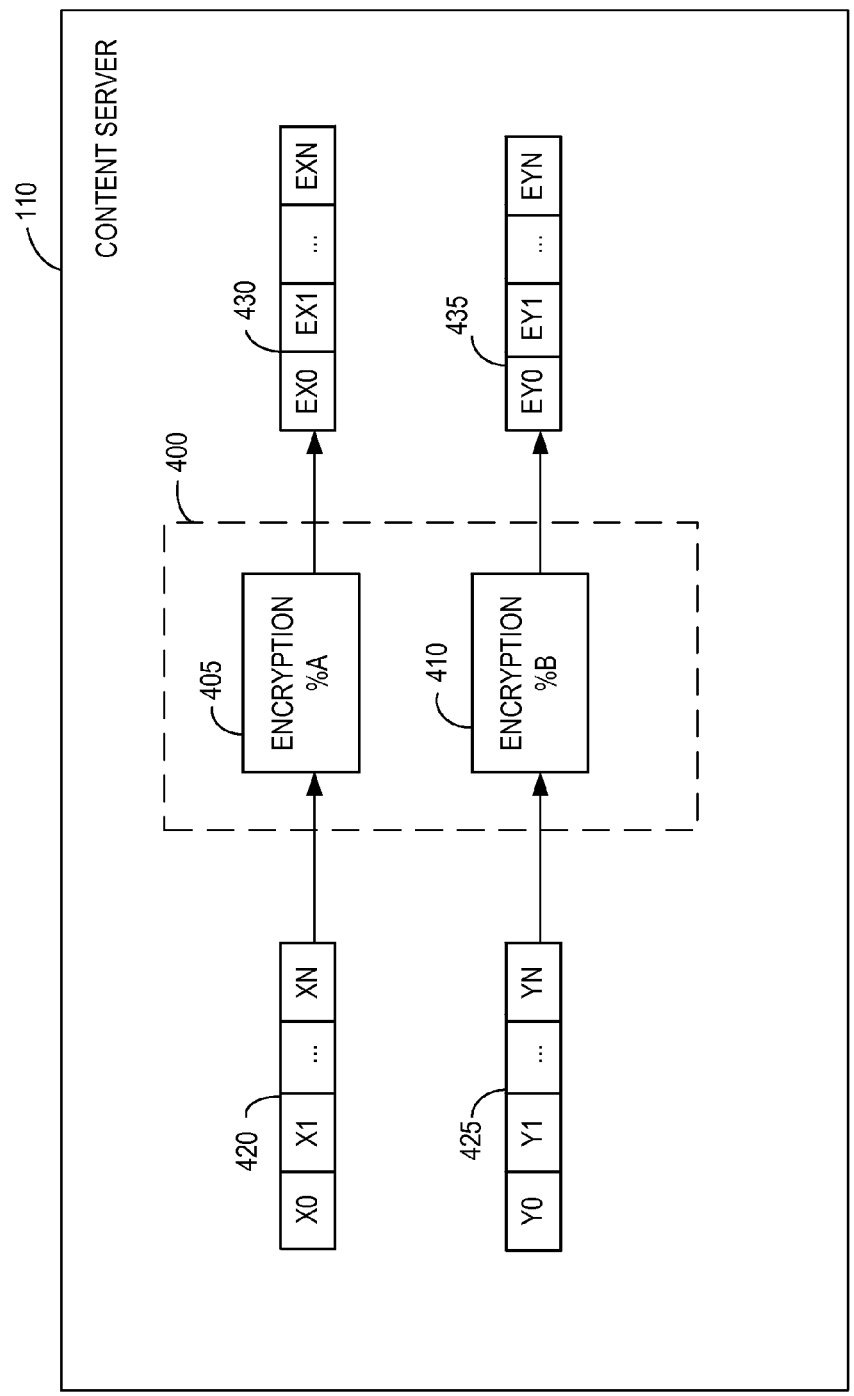
FIG. 4 is schematic block diagram illustrating an exemplary operation of a content server for encrypting content streams using different encryption percentages in accordance with embodiments of the present invention.

FIG. 4 illustrates an exemplary operation of a content server 110 for encrypting watermarked content streams 420 and 425 using different encryption percentages 405 and 410 in accordance with embodiments of the present invention. The content server 110 includes encryption logic 400 for applying the different encryption percentages 405 and 410 to the content streams 420 and 425.

For example, a first watermarked content stream 420, including content segments X0, X1, . . . XN can be input to the encryption logic 400 to encrypt the first content stream 420 at a first encryption percentage (Encryption % A) 405. The output of encryption block 405 can be a first encrypted and watermarked content stream 430 having a first percentage of encrypted content, as determined by the encryption percentage applied at encryption block 405. In an exemplary embodiment, the encryption percentage 405 can be mapped to each of the content segments X0, X1 . . . XN to produce encrypted content segments EX0, EX1, . . . EXN, each having the same percentage of encrypted content (e.g., Encryption % A).

In addition, a second watermarked content stream 425, including content segments Y0, Y1, . . . YN can be input to the encryption logic 400 to encrypt the second content stream 425 at a second encryption percentage (Encryption % B) 410. Each of the content segments Y0, Y1, . . . YN in the second watermarked content stream 425 can temporally correspond to one of the content segments X0, X1, . . . XN in the first watermarked content stream 420, such that corresponding content segments (e.g., X0 and Y0) include the same portion of media content but different watermark information. The output of encryption block 410 can be a second encrypted and watermarked content stream 435 having a second percentage of encrypted content, as determined by the encryption percentage applied at encryption block 410. In an exemplary embodiment, the encryption percentage 410 can be mapped to each of the content segments Y0, Y1, . . . YN to produce encrypted content segments EY0, EY1, . . . EYN, each having the same percentage of encrypted content.

In accordance with various embodiments of the invention, Encryption % B is different than Encryption % A to ensure that the encrypted content streams 430 and 435 can be distinguished from each other at the client device. The encryption percentages 405 and 410 can be predetermined or dynamically selected based on various factors, such as the type of media content, instructions from the content owner and other criteria.

In one embodiment, the encryption logic 400 utilizes a Common Encryption (CENC) algorithm to encrypt each of the content streams 420 and 425. In other embodiments, other types of encryption can be used in addition to or in lieu of CENC.

Figure 5:
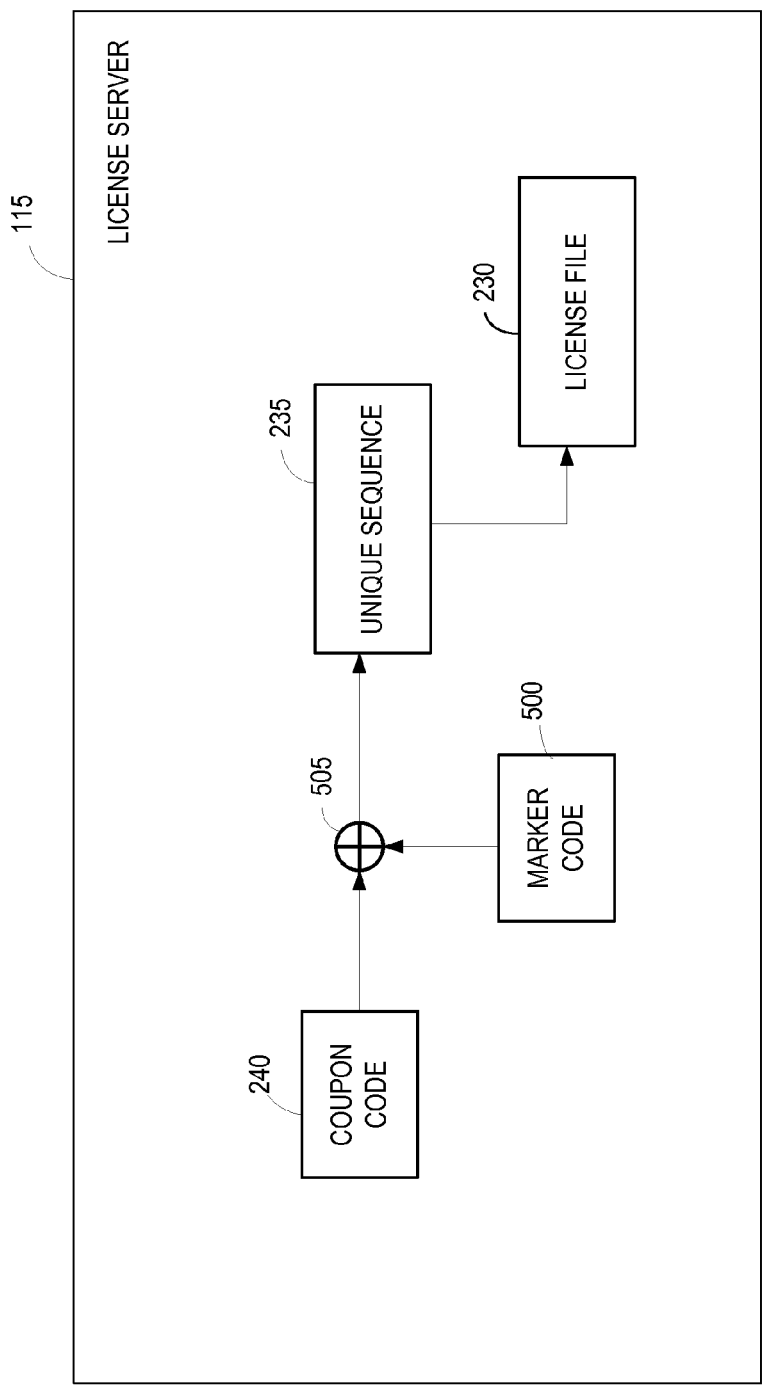
FIG. 5 is a schematic block diagram illustrating an exemplary operation of a license server for generating a unique sequence for session based watermarking in accordance with embodiments of the present invention.

FIG. 5 illustrates an exemplary operation of a license server 115 generating a unique sequence 235 for session based watermarking in accordance with embodiments of the present invention. The license server 115 can receive, for example, a coupon code 240 from a client device as part of a license request initiated by the client device. The coupon code 240 uniquely identifies the client device. For example, the coupon code can be an identifier assigned to a hard disk drive (internal or external) associated with the client device.

The license server 115 can combine the coupon code 240 with a predetermined code (hereinafter referred to as a marker code 500) to produce the unique sequence 235. In an exemplary embodiment, the license server 115 performs an exclusive OR operation 505 on the coupon code 240 and marker code 500 to produce the unique sequence 235. The marker code 500 can be stored within the license server 115 or retrieved from another network device, such as the content server or a watermarking server that generated the watermarked content streams. In addition, the same marker code 500 can be used to generate unique sequences for different users or different marker codes 500 can be used for different users.

In an exemplary embodiment, the unique sequence 235 can then be included in the license file 230 sent to the client device. The license file 230 may further include additional license information indicating the terms and/or conditions of the license provided to the client device. In other embodiments, the license server 115 can send the unique sequence 235 to the client device separate from the license file 230 or content streams.

Figure 6:
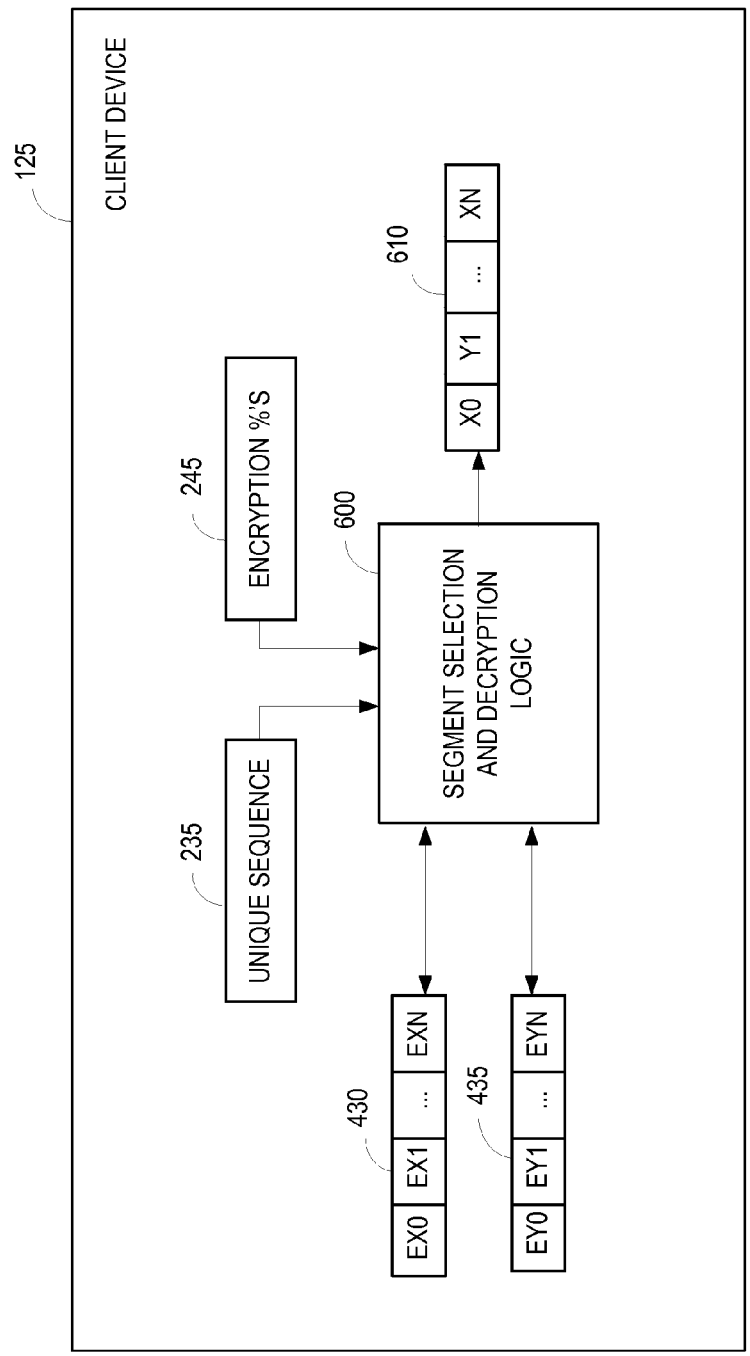
FIG. 6 is a schematic block diagram illustrating an exemplary operation of a client device for producing watermarked media content in accordance with embodiments of the present invention.

FIG. 6 illustrates an exemplary operation of a client device 125 for producing watermarked media content in accordance with embodiments of the present invention. The client device 125 includes segment selection and decryption logic 600 for accessing encrypted content streams 430 and 435 streamed to the client device 125. The encrypted content streams 430 and 435 can include temporally corresponding encrypted content segments. For example, encrypted content stream 430 can include encrypted content segments EX0, EX1, . . . EXN and encrypted content stream 435 can include corresponding encrypted content segments EY0, EY1, . . . EYN.

The segment selection and decryption logic 600 can use the unique sequence 235 sent to the client device 125 for the media content of the content streams 430 and 435 to select consecutive encrypted content segments of the media content from the encrypted content streams 430 and 435. The segment selection and decryption logic 600 can further use the unique sequences 235 to decrypt those selected content segments and produce a decrypted content stream 610. For example, as shown in FIG. 6, the decrypted content stream 610 can include decrypted content segments X0, Y1, . . . XN based on the unique sequence 235.

In addition, upon selecting an encrypted content segment from an encrypted content stream (i.e., EX0 from encrypted content stream 430) based on the unique sequence 235, the segment selection and decryption logic 600 can further determine the actual encryption percentage of that content segment EX0. For example, the segment selection and decryption logic 600 can calculate the actual encryption percentage as the ratio of the number of bytes unencrypted to the number of bytes encrypted. The segment selection and decryption logic 600 can then access the expected encryption percentage 245 of encrypted content stream 430 and compares the actual encryption percentage of the selected content segment EX0 with the expected encryption percentage 245 for that content segment EX0. If the compared encryption percentages match, the segment selection and decryption logic 600 can decrypt the selected content segment EX0 to produce decrypted content segment X0 for rendering by the client device 125. However, if the compared encryption percentages do not match, the segment selection and decryption logic 600 can flag the playback of the media content as invalid.

In one embodiment, the segment selection and decryption logic 600 compares the actual encryption percentage to the expected encryption percentage for each selected content segment (i.e., EX0, EY1, . . . EXN). In other embodiments, the segment selection and decryption logic 600 compares the actual encryption percentage to the expected encryption percentage for only a portion of the selected content segments, such as those selected content segments that follow a switch between encrypted content streams 430 and 435 or a randomly selected portion of encrypted content segments.

Figure 7:
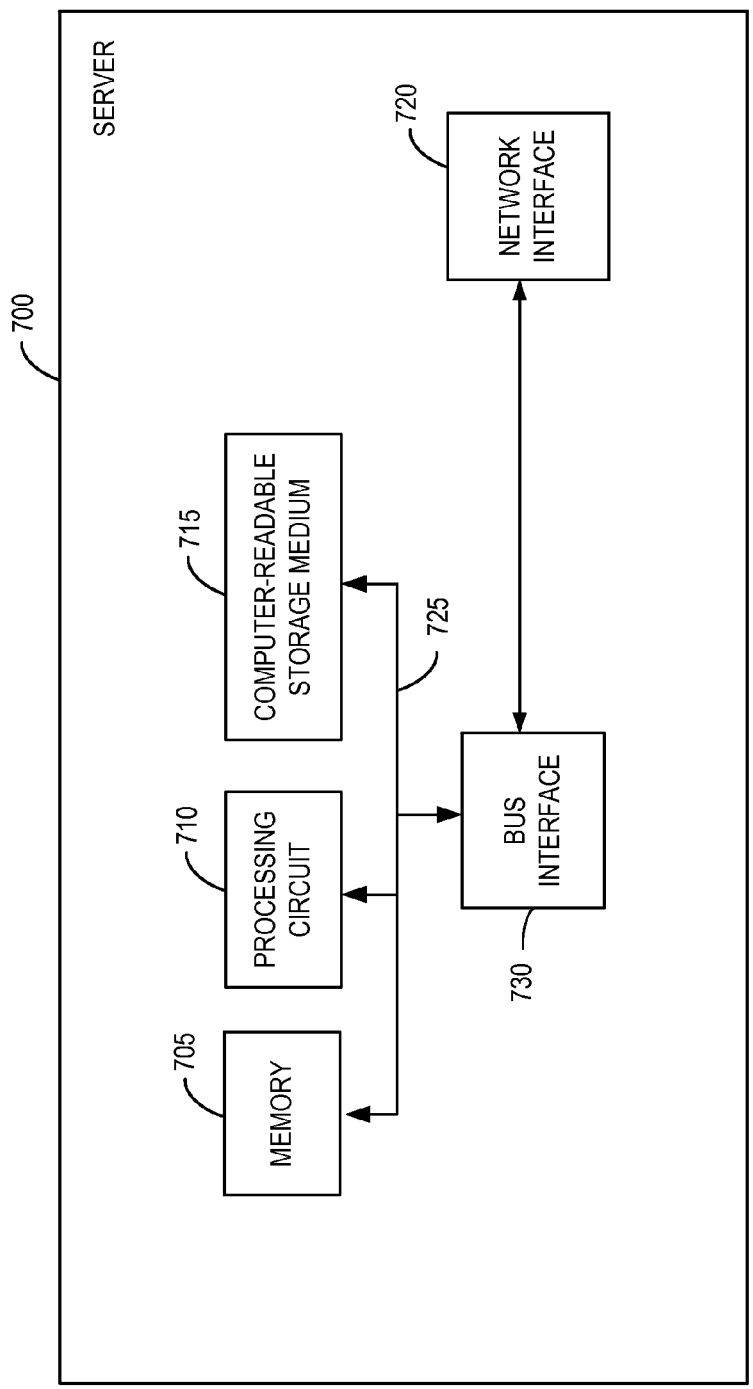
FIG. 7 is a block diagram illustrating an exemplary hardware implementation for a server in accordance with embodiments of the invention.

FIG. 7 illustrates an exemplary hardware implementation for a server 700 that executes any of the steps, functions and/or methods described herein for producing and providing encrypted content streams, unique sequences and/or license information in accordance with embodiments of the invention. The server 700 may correspond to, for example, the content server 110 and/or the license server 115 of FIGS. 1-5. The server 700 includes a memory 705, processing circuit 710, computer-readable storage medium 715, network interface 720, bus 725 and a bus interface 730. The processing circuit 710 may be configured to perform any of the steps, functions, and/or methods described herein with respect to FIGS. 1-5 and 9.

The processing circuit 710 may include one or more processors (e.g., first processor, etc.) that are adapted to process data for the server 700. Examples of processing circuits 704 include microprocessors, microcontrollers, digital signal processors (DSPs), field programmable gate arrays (FPGAs), programmable logic devices (PLDs), gated logic, discrete hardware circuits, application specific integrated circuits (ASICs) and other suitable hardware configured to perform the various functionality described throughout this disclosure. The processing circuit 710 is also responsible for managing the bus 725, and executing software stored on the computer-readable storage medium 715 and/or memory 705. The software, when executed by the processing circuit 710, causes the processing circuit 710 to perform the various functions, steps, and/or processes described herein with respect to FIGS. 1-5 and 9. The computer-readable storage medium 715 may be used for storing data that is manipulated by the processing circuit 710 when executing software.

The memory 705 may be non-volatile memory, such as but not limited to FLASH memory, magnetic or optical hard disk drives, etc. In some aspects, the memory may be volatile memory, such as DRAM (e.g., DDR SDRAM), SRAM, etc., that may be continuously powered so as to store the information indefinitely.

Software or instructions shall be construed broadly to mean software, instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable storage medium 715. The computer-readable storage medium 715 may be a non-transitory computer-readable storage medium. A non-transitory computer-readable storage medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable storage medium 715 may reside in the processing circuit 710, external to the processing circuit 715, or distributed across multiple entities including the processing circuit 710. The computer-readable storage medium 715 may be embodied in a computer program product.

In the example of FIG. 7, the server 700 is implemented using a bus architecture, represented generally by the bus 725. The bus 725 may include any number of interconnecting buses and bridges depending on the specific application of the server 700 and the overall design constraints. The bus 725 links together various circuits including one or more processors (represented generally by the processing circuit 710), the memory 705, and computer-readable media (represented generally by the computer-readable storage medium 715). The bus 725 may also link various other circuits such as timing sources, peripherals, voltage regulators, and power management circuits, which are well known in the art, and therefore, will not be described any further. The bus interface 730 provides an interface between the bus 725 and the network interface 720. The network interface 720 provides a means for communicating with other apparatuses via a network over transmission media. For example, the network interface 720 may be configured to communicate using various communication protocols, such as the Transmission Control Protocol/Internet Protocol (TCP/IP), and may include a transceiver, transceiving device or network interface card (NIC).

Figure 8:
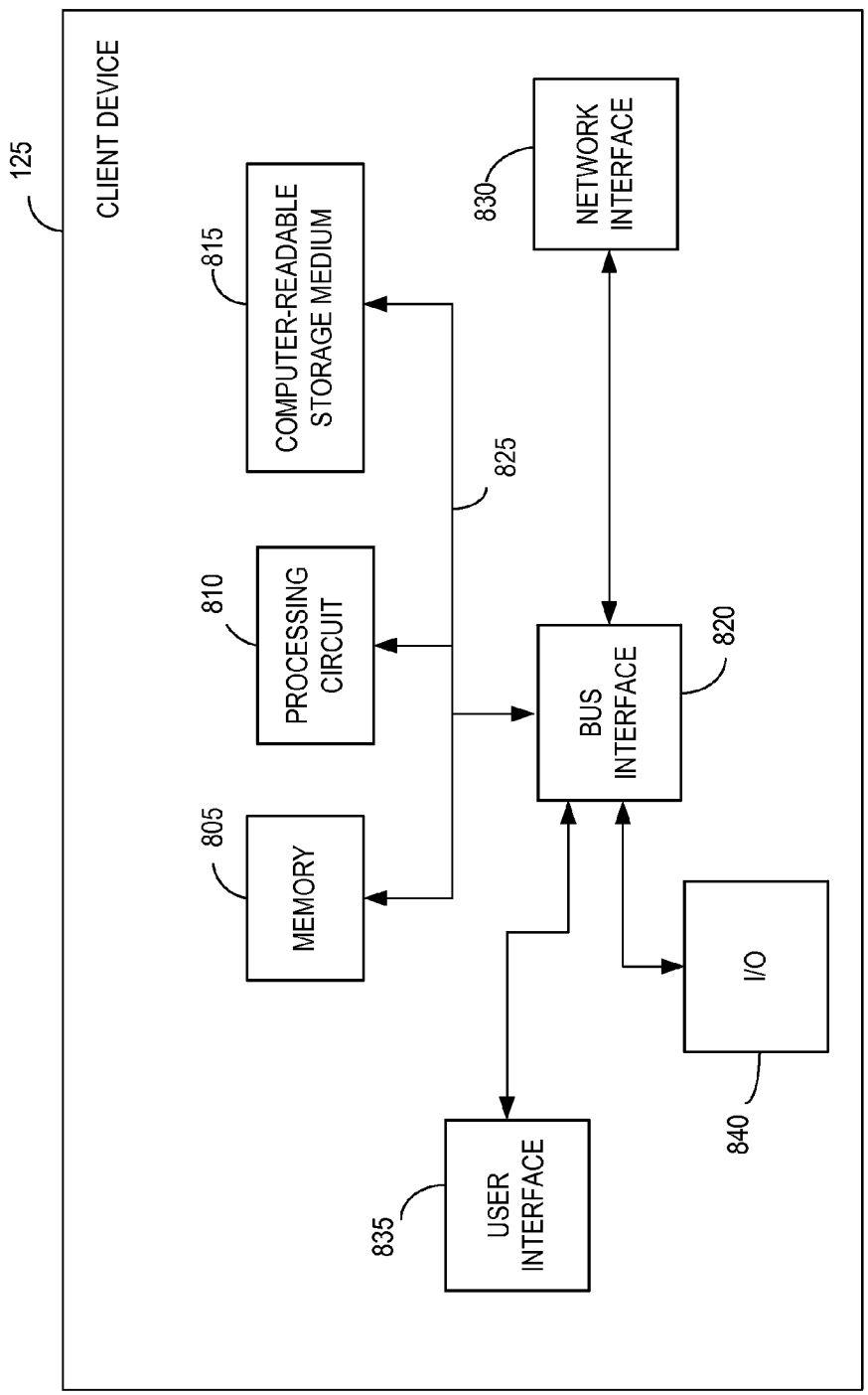
FIG. 8 is a block diagram illustrating an exemplary hardware implementation for a client device in accordance with embodiments of the present invention.

FIG. 8 illustrates an exemplary hardware implementation for a client device that executes any of the steps, functions and/or methods described herein for receiving encrypted content streams, selecting content segments based on a unique sequence to produce watermarked media content and comparing actual and expected encryption percentages of selected content streams in accordance with embodiments of the invention. The client device 125 includes a video display adapter 800, memory 805, processing circuit 810, computer-readable storage medium 815, bus interface 820, bus 825, network interface 830, user interface 835 and input/output (I/O) interface 840. The processing circuit 810 may be configured to perform any of the steps, functions, and/or processes described with respect to FIGS. 1-3, 6 and 10.

The processing circuit 810 may be one or more processors (e.g., first processor, etc.) that are adapted to process data for the client device 125. Examples of processing circuits 810 include microprocessors, microcontrollers, digital signal processors (DSPs), field programmable gate arrays (FPGAs), programmable logic devices (PLDs), gated logic, discrete hardware circuits, application specific integrated circuits (ASICs) and other suitable hardware configured to perform the various functionality described throughout this disclosure. The processing circuit 810 is also responsible for managing the bus 825, and executing software stored on the computer-readable storage medium 815 and/or memory 805. The software, when executed by the processing circuit 810, causes the processing circuit 810 to perform the various functions, steps, and/or processes described herein with respect to FIGS. 1-3, 6 and 10. The computer-readable storage medium 815 may be used for storing data that is manipulated by the processing circuit 810 when executing software.

The memory 805 may be non-volatile memory, such as but not limited to FLASH memory, magnetic or optical hard disk drives, etc. In some aspects, the memory may be volatile memory, such as DRAM (e.g., DDR SDRAM), SRAM, etc., that may be continuously powered so as to store the information indefinitely.

Software or instructions shall be construed broadly to mean software, instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable storage medium 715. The computer-readable storage medium 815 may be a non-transitory computer-readable storage medium. A non-transitory computer-readable storage medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable storage medium 815 may reside in the processing circuit 810, external to the processing circuit 810, or distributed across multiple entities including the processing circuit 810. The computer-readable storage medium 815 may be embodied in a computer program product.

In the example of FIG. 8, the client device 125 is implemented using a bus architecture, represented generally by the bus 825. The bus 825 may include any number of interconnecting buses and bridges depending on the specific application of the processing circuit 810 and the overall design constraints. The bus 825 links together various circuits including one or more processors (represented generally by the processing circuit 810), the video display adapter 800, the memory 805, and computer-readable media (represented generally by the computer-readable storage medium 815). The bus 825 may also link various other circuits such as timing sources, peripherals, voltage regulators, and power management circuits, which are well known in the art, and therefore, will not be described any further. The bus interface 820 provides an interface between the bus 825 and the network interface 830. The network interface 830 provides a means for communicating with other apparatuses over a network via a transmission medium. For example, the network interface 720 may be configured to communicate using various communication protocols, such as the Transmission Control Protocol/Internet Protocol (TCP/IP), and may include a transceiver, transceiving device or network interface card (NIC).

Depending upon the nature of the apparatus, a user interface 840 (e.g., keypad, display, speaker, microphone, touchscreen display, etc.) may also be provided for the client device 125. In addition, an I/O interface 840 may link the client device 125 to other external peripherals, such as an external display, speakers, keyboard or hard disk drive. For example, the I/O interface 840 may include one or more USB connectors or other types of connectors.

Figure 9:
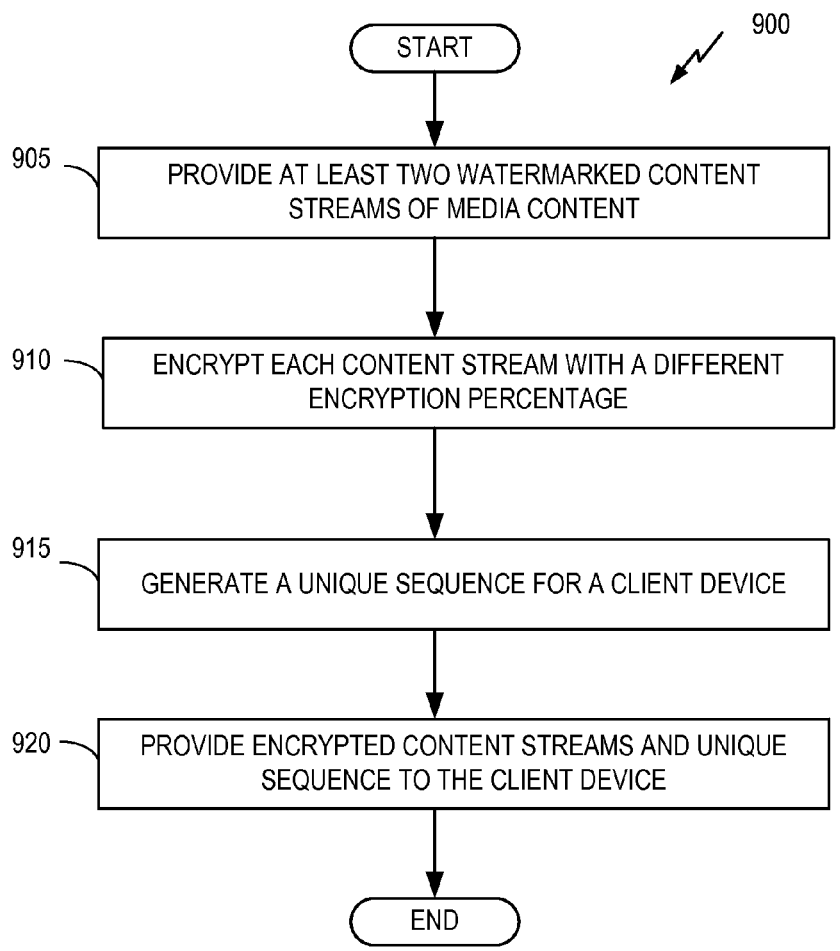
FIG. 9 is a flow chart illustrating a session based watermarking method in accordance with embodiments of the present invention.

FIG. 9 illustrates a session based watermarking method 900 in accordance with embodiments of the present invention. The method 900 can be performed, for example, by one or more network server, such as the content server and license server shown in FIGS. 1-5 and 7. The method begins at 905, where at least two watermarked content streams of media content are provided. Each watermarked content stream can include a plurality of content segments and corresponding content segments in each of the watermarked content streams can include the same portion of the media content and different watermark information. At 910, each of the watermarked content streams is encrypted using a different encryption percentage. For example, each watermarked content stream can be encrypted using a different CENC partial percentage.

The method continues at 915, where a unique sequence is generated for a client device. The unique sequence can be generated, for example, in response to determining that a license can be granted to a user of the client device for the media content. The unique sequence uniquely identifies a user of the client device and represents consecutive content segments selected from the content streams to produce the original media content having the appropriate watermark for the user. In an exemplary embodiment, the unique sequence is generated based on, for example, an identifier associated with the client device. At 920, the encrypted content streams and unique sequence are provided to the client device to enable the client device to establish a playback session of the media content. In an exemplary embodiment, based on the unique sequence, the playback session includes at least one switch between the content streams.

Figure 10:
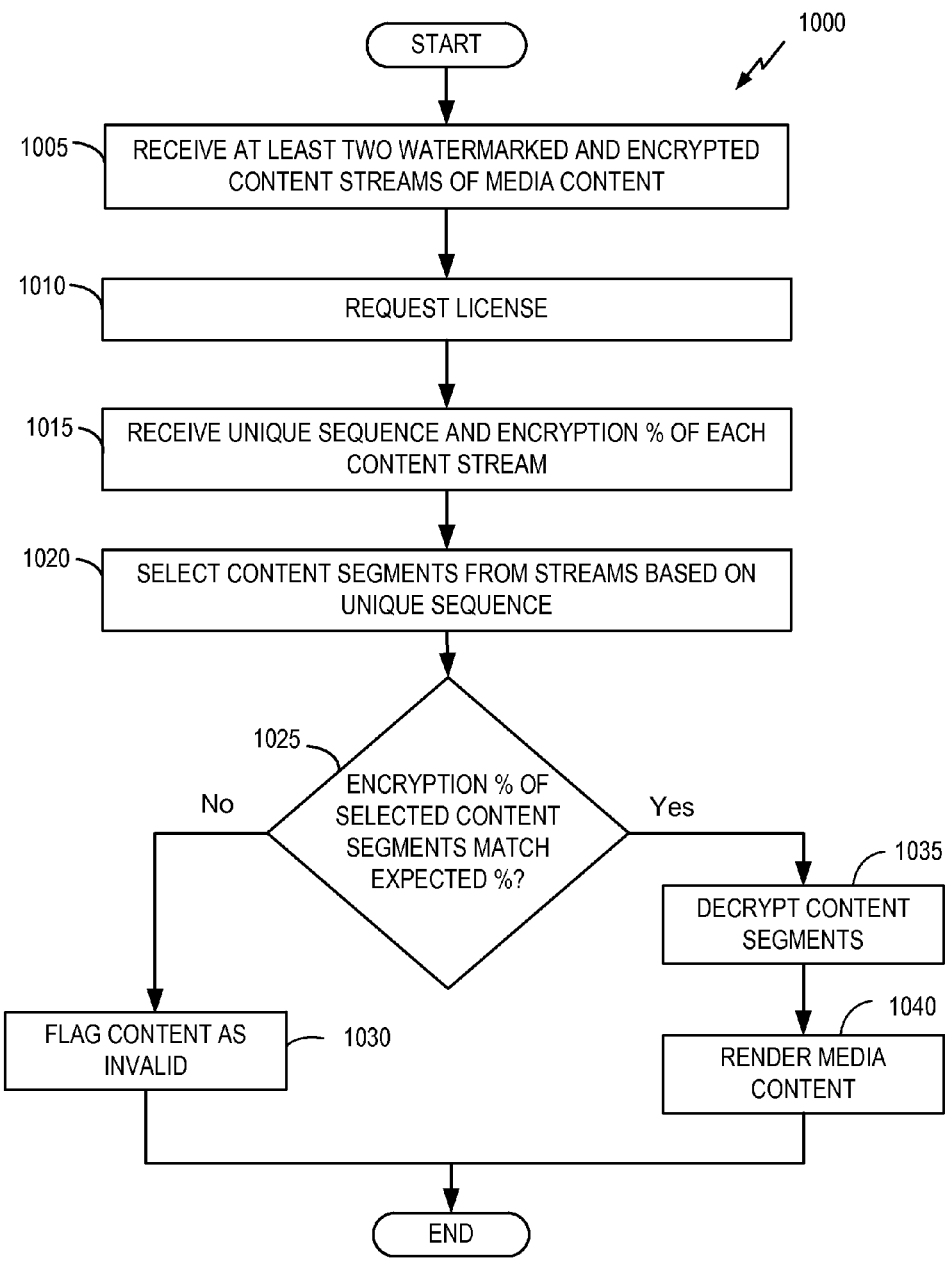
FIG. 10 is a flow chart illustrating a method for establishing a playback session of watermarked media content in accordance with embodiments of the present invention.

FIG. 10 illustrates a method 1000 for establishing a playback session of watermarked media content in accordance with embodiments of the present invention. The method 1000 can be performed, for example, by the client device shown in FIGS. 1-3, 6 and 8. The method begins at 1005, where at least two watermarked and encrypted content streams of media content are received at a client device. Each of the watermarked and encrypted content streams can include a plurality of content segments and corresponding content segments in each of the watermarked content streams can include the same portion of the media content and different watermark information. In addition, each of the watermarked and encrypted content streams can be encrypted using a different encryption percentage.

At 1010, the client device requests a license for the media content. Upon receiving a license for the media content, at 1015, the client device further receives a unique sequence generated for the client device, along with the encryption percentages of each watermarked and encrypted content stream. At 1020, the client device selects temporally consecutive content segments from the content streams based on the unique sequence to produce the original media content with watermark information that identifies the user. At 1025, the client device compares the actual encryption percentage of the selected content segments with the expected encryption percentage for those selected content segments. If the encryption percentages do not match, at 1030, the client device flags the playback of the media content as invalid. If the encryption percentages do match, at 1035, the client device decrypts the selected content segments, and at 1040, renders the decrypted media content.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

What is claimed is:

1. A method for session based watermarking of media content, comprising:
   encrypting a first content stream using a first encryption percentage to produce a first encrypted content stream having a first percentage of encrypted content;
   encrypting a second content stream using a second encryption percentage to produce a second encrypted content stream having a second percentage of encrypted content different than the first percentage of encrypted content, each of the first and second content streams including different watermark information;
   generating a unique sequence for a client device, the unique sequence representing consecutive content segments selected from a first plurality of content segments of the first content stream and a second plurality of content segments of the second content stream; and
   providing the first encrypted content stream and the second encrypted content stream to the client device to enable a playback session of the media content to be established using the unique sequence generated for the client device, the playback session including at least one switch between the first encrypted content stream and the second encrypted content stream at the client device;
   wherein the generating the unique sequence further comprises:
      receiving a coupon code from the client device, the coupon code identifying the client device; and
      combining the coupon code with a marker code to produce the unique sequence.

2. The method of claim 1, wherein each of the second plurality of content segments corresponds to a respective one of the first plurality of content segments such that corresponding content segments include a same portion of the media content.

3. The method of claim 1, further comprising:
   receiving a license request for the media content from the client device; and
   providing a license file to the client device, the license file including the unique sequence.

4. The method of claim 3, wherein the license file further includes the first encryption percentage of the first encrypted content stream and the second encryption percentage of the second encrypted content stream.

5. The method of claim 1, further comprising:
   including the first encryption percentage in first metadata within the first encrypted content stream; and
   including the second encryption percentage in second metadata within the second encrypted content stream.

6. The method of claim 1, wherein the combining the coupon code with the marker code further comprises:
   performing an exclusive OR operation on the coupon code and the marker code.

7. The method of claim 1, wherein each of the first percentage of encrypted content and the second percentage of encrypted content are greater than zero.

8. A method for establishing a playback session of media content at a client device, comprising:
   receiving a first encrypted content stream of the media content from a content server, the first encrypted content stream including a first plurality of content segments and having a first percentage of encrypted content;
   receiving a second encrypted content stream of the media content from the content server, the second encrypted content stream including a second plurality of content segments and having a second percentage of encrypted content different than the first percentage of encrypted content, each of the first and second encrypted content streams including different watermark information;
   receiving a unique sequence;
   receiving an expected encryption percentage for each of the first encrypted content stream and the second encrypted content stream;
   selecting consecutive content segments of the media content from the first plurality of content segments and the second plurality of content segments based on the unique sequence, wherein the selecting includes switching, at least once, between the first encrypted content stream and the second encrypted content stream;
comparing an actual encryption percentage of a selected content segment with the expected encryption percentage for the selected content segment based on the respective content stream; and
determining whether to render the media content by the client device based on the comparing of the actual encryption percentage with the expected encryption percentage.

9. The method of claim 8, wherein each of the second plurality of content segments corresponds to a respective one of the first plurality of content segments such that corresponding content segments include a same portion of the media content.

10. The method of claim 8, further comprising:
rendering the media content by the client device when the actual encryption percentage matches the expected encryption percentage for at least two selected content segments.

11. The method of claim 8, further comprising:
flagging playback of the media content as invalid when the actual encryption percentage does not match the expected encryption percentage.

12. The method of claim 8, further comprising:
transmitting a license request for the media content to a license server; and
receiving a license file from the license server, the license file including the unique sequence.

13. The method of claim 12, wherein the license file further includes the expected encryption percentage for each of the first encrypted content stream and the second encrypted content stream.

14. The method of claim 8, further comprising:
receiving the expected encryption percentage for the first encrypted content stream in first metadata within the first encrypted content stream; and
receiving the expected encryption percentage for the second encrypted content stream in second metadata within the second encrypted content stream.

15. The method of claim 8, wherein the receiving the unique sequence further comprises:
transmitting a coupon code to a license server, the coupon code identifying the client device; and
receiving the unique sequence from the license server, the unique sequence being a combination of the coupon code and a marker code.

* * * * *